United States Patent [19]

Sharp et al.

[11] Patent Number: 4,708,160
[45] Date of Patent: Nov. 24, 1987

[54] POST ASSEMBLY FOR BURIED VALVE HAVING AN ABOVE GROUND ACTUATOR

[75] Inventors: Steve M. Sharp, Naperville; John R. Holstrom; Lorand H. Gain, Jr., both of Montgomery; John V. Ballun, Plainfield, all of Ill.

[73] Assignee: Amsted Industries Incorporated, Chicago, Ill.

[21] Appl. No.: 899,721

[22] Filed: Aug. 25, 1986

[51] Int. Cl.⁴ .............................................. F16L 5/00
[52] U.S. Cl. ................................... 137/368; 137/556; 137/797
[58] Field of Search .............. 137/556, 363, 364, 368, 137/797

[56] References Cited

U.S. PATENT DOCUMENTS

| | | | |
|---|---|---|---|
| 1,800,010 | 4/1931 | Emerson | 137/797 |
| 2,171,078 | 8/1939 | Cline | 137/797 |
| 2,249,848 | 7/1941 | O'Brien | 137/797 |
| 3,331,397 | 7/1967 | Mueller et al. | 137/797 |
| 3,738,390 | 6/1973 | Luckenbill | 137/797 |
| 3,804,056 | 4/1974 | Lee et al. | 116/277 |
| 4,448,148 | 5/1984 | Gain, Jr. | 116/277 |

Primary Examiner—A. Michael Chambers
Attorney, Agent, or Firm—Charles E. Bouton; Edward J. Brosius

[57] ABSTRACT

An improved post assembly for operating an inaccessible valve having upper and lower connecting shaft portions within respective upper and lower column sections wherein each of the shaft portions and column sections are connected by breakaway means enabling the parts to be separated by impact, and replaceable, at a level above grade, and also having an attachment between the lower connecting shaft and a valve shaft.

10 Claims, 19 Drawing Figures

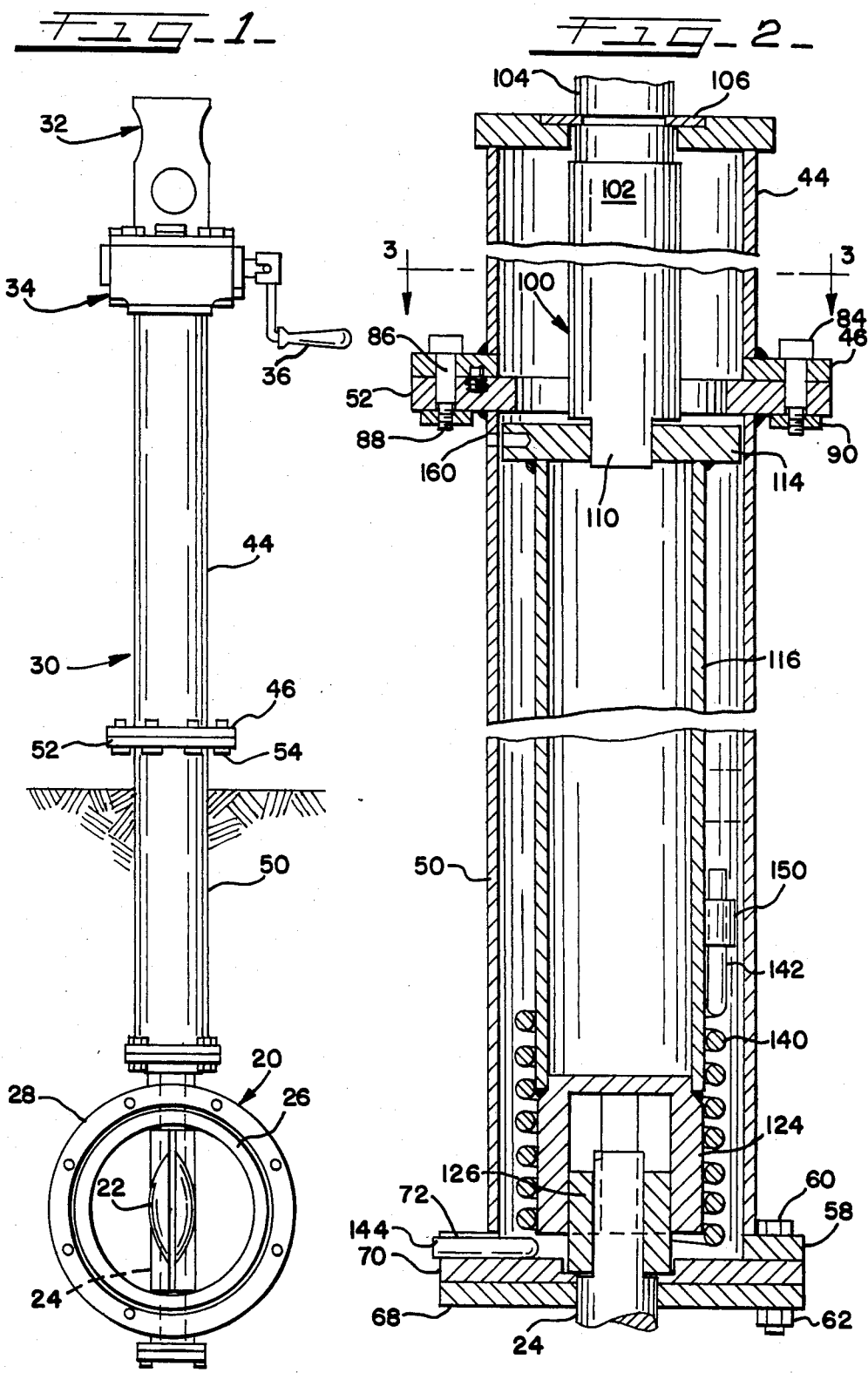

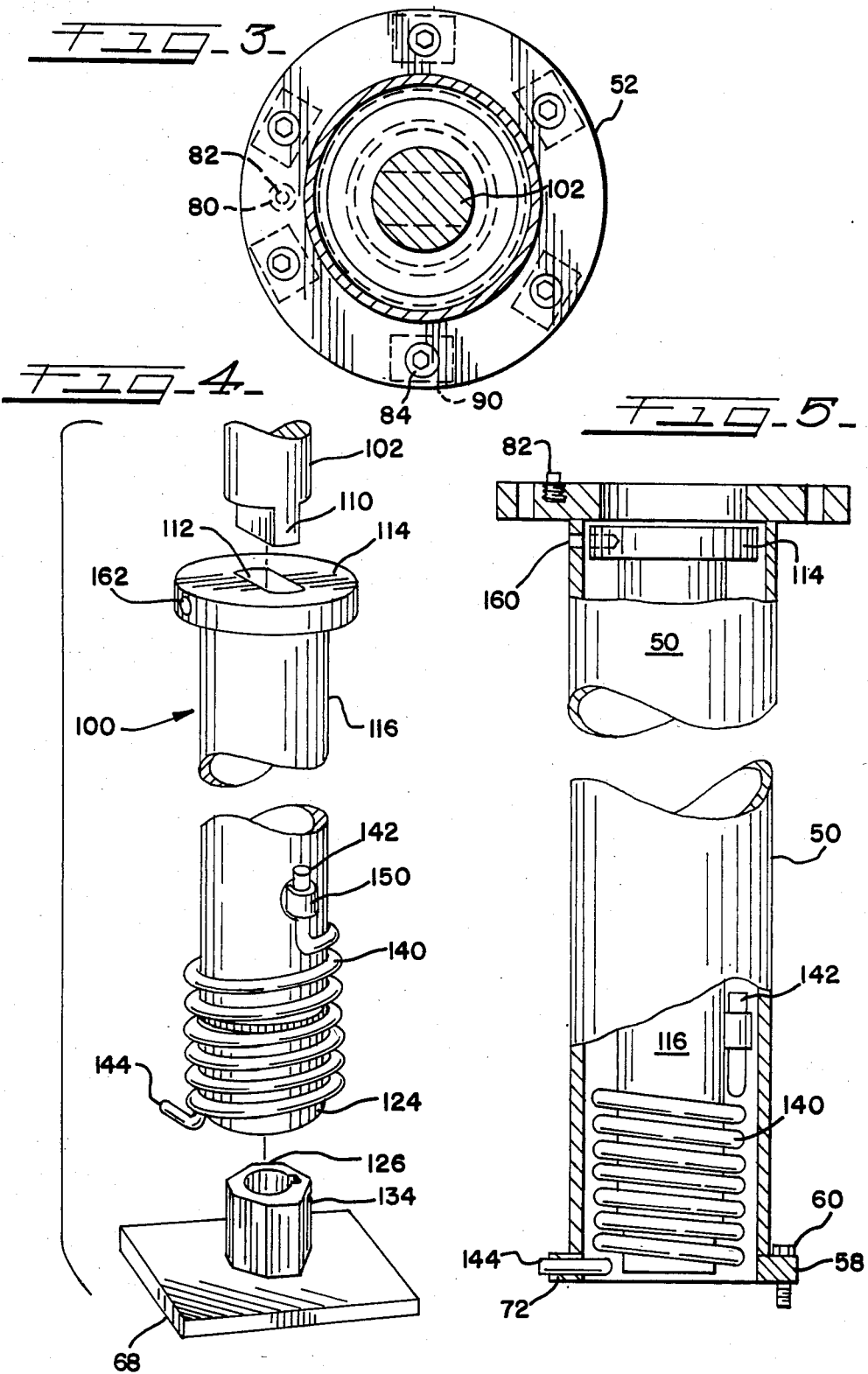

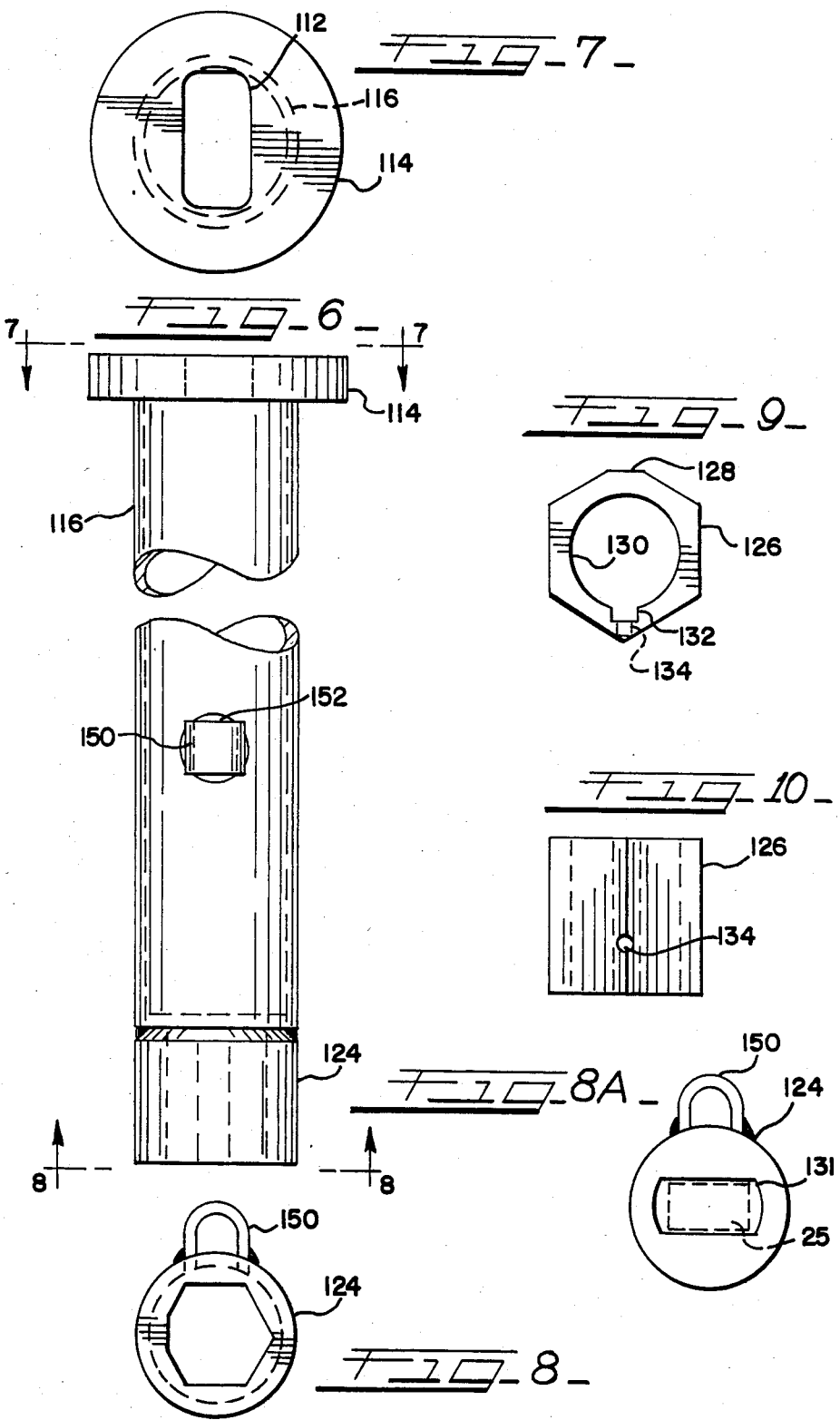

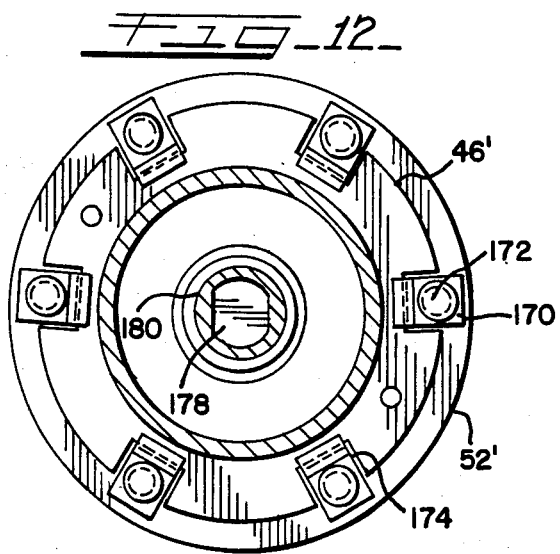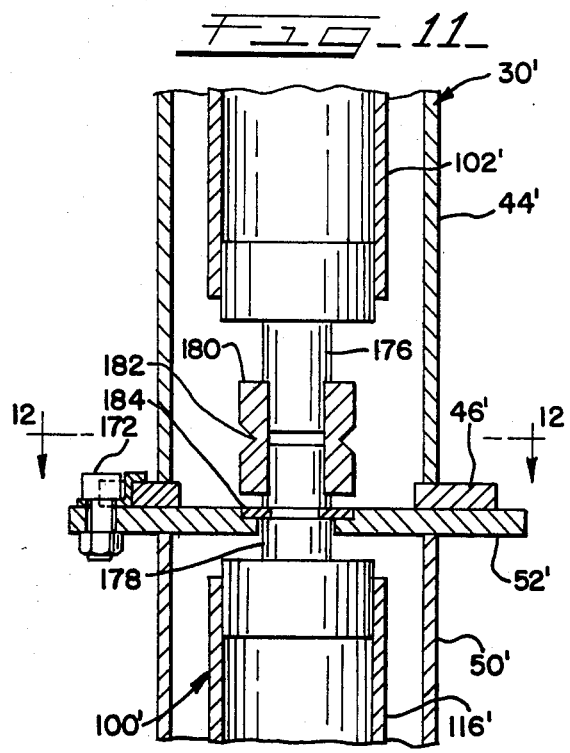

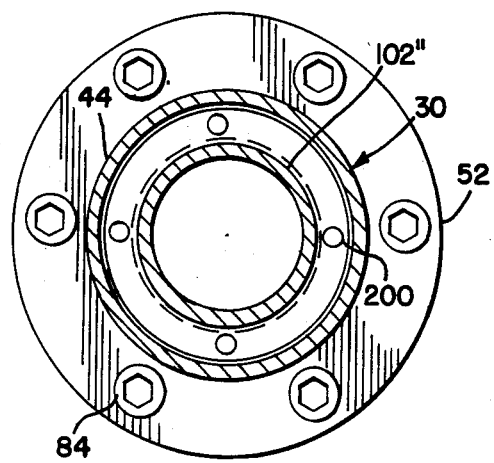
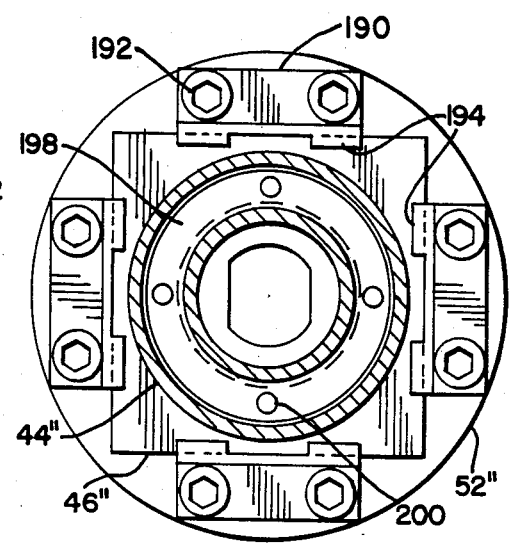
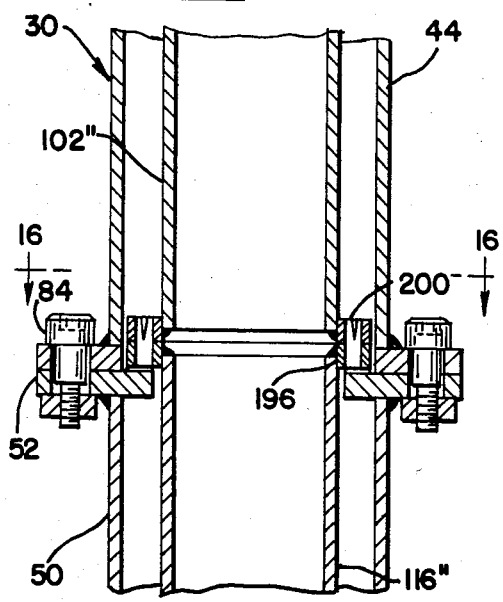
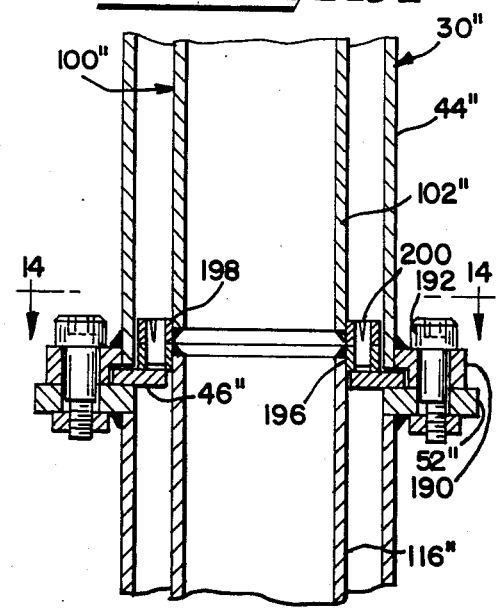

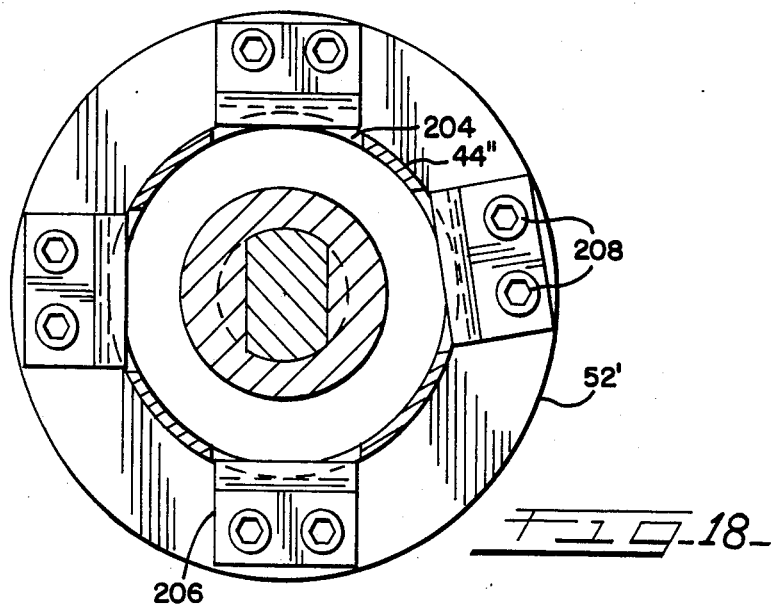
FIG.-18-
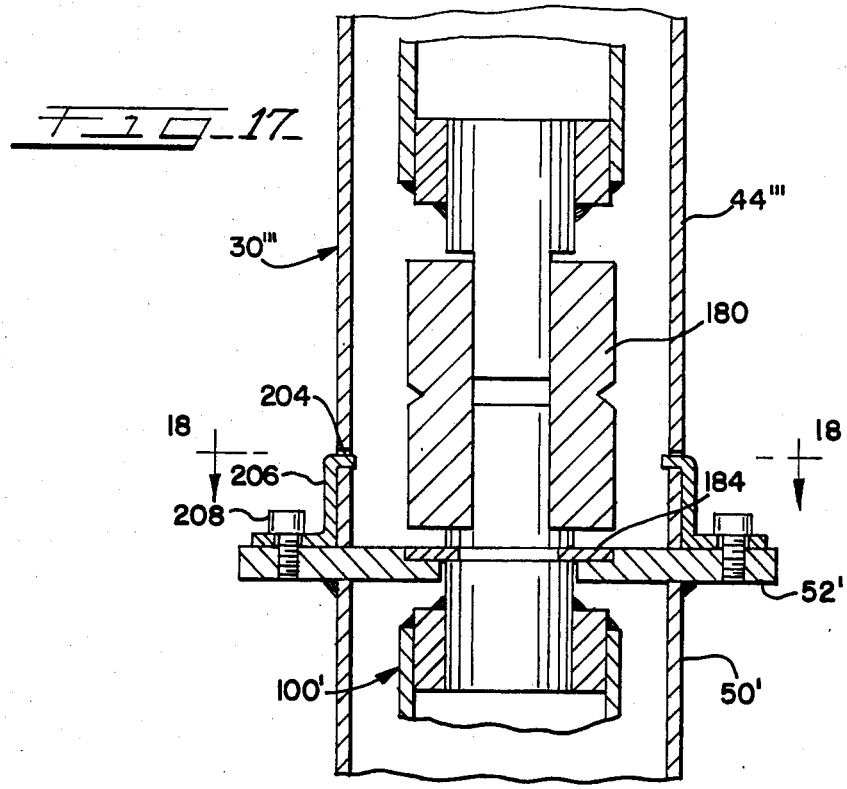
FIG.-17-

POST ASSEMBLY FOR BURIED VALVE HAVING AN ABOVE GROUND ACTUATOR

The present invention involves a post assembly through which a buried or otherwise inaccessible valve is operated, and more specifically is directed to an improved post assembly having improved break away features to protect the buried valve and allow for easy repair should the above ground portions be impacted.

BACKGROUND OF THE INVENTION

In subsurface fluid distribution systems, such as water pipes in fire suppression systems, it is often necessary to provide valves that are manually operable from above ground and also provide means to easily and visibly indicate above ground the position of the valve. There is a widely utilized valve assembly in use currently that is known as a post indicating valve assembly. Such an assembly includes a butterfly valve comprised of a disk rotatable 90° on a valve shaft within a housing having connector flanges, or the like, to secure to underground pipes, a mechanical actuator to turn the valve shaft and disk between open and closed positions, an above ground indicator, a support column extending between the valve and indicator, a connecting shaft within the column for turning the indicator in unison with the valve shaft, and a torsion spring adjacent the valve shaft to bias the valve disk to the open position against the possibility of a mechanical failure.

In valve assemblies of this type, it is possible to locate the mechanical actuator either below ground closely adjacent the valve, or above ground on the support column, remote from the valve. In the latter form, which is the main subject of this invention, the connecting shaft usually is connected to both indicator and actuator. (Both forms are illustrated in U.S. Pat. No. 3,693,647 to Robert P. Saar.) There are advantages and disadvantages associated with each form.

The mechanical actuator is simply a mechanically advantaged system of worm (or screw) and spur gears to enable an attendant to apply sufficient torque to move the valve between open and closed positions against the force of fluid in the system. Thus, if the actuator is located above ground, where it is exposed to weather and accident but may be easily serviced and replaced if necessary, it may be crank operated and the support column and connecting shaft must be of sufficient strength and rigidity to transmit the torque force to the valve; and since the above ground actuator is easily replaceable, it may be of lighter weight, relatively less expensive construction.

Conversely, if the actuator is in the protected location underground adjacent the valve, the support column and connecting shaft are subject to relatively less torque and thus may be light weight; but the actuator is not available for servicing or replacement without excavating the valve. Moreover, most assemblies of the latter form require a separate drive shaft or wrench by which an attendant turns the buried actuator; and the usual buried actuator form of valve assembly employs a separate access riser between actuator and surface in addition to the column supporting the indicator (which usually is connected by the connecting shaft directly to the valve shaft).

The indicator (known as a "target") must be above ground and, indeed, is usually elevated about 36 inches above grade so as to be visible from a distance of several hundred feet. One indicator embodiment has comprised a stationary cover fastened at the top of the support column, and having plural apertures about its periphery, and a rotatable sleeve within said cover attached to the connecting shaft. The rotatable sleeve has an equal plurality of apertures spaced in its body so as to coincide with the apertures in the cover when the valve is in the open position. Thus it is important that the proper relative positions of the cover, support column and valve housing as well as the relationship between the rotatable sleeve, connecting shaft and valve shaft be maintained when assembling or reassembling the components so that the indicator accurately represents the position of the valve.

The latter relationships have been so important that the post supported valve actuator and indicator are usually fully assembled with the valve at the manufacturing plant and not altered in the field. This practice, while insuring accurate assembly, presents an inventory disadvantage since for any given valve size there are a wide range of column lengths dependent only on the depth to which the valve is to be buried.

Further still, the present post indicator valve assemblies are exposed to above ground accident and impact by reason of the fact that many installations are in fluid lines that are close to vehicular pathways. Moreover, installations remote to such pathways may be at risk from farm and/or maintenance equipment and occasionally off-road vehicles used by inspection personnel. In either instance, there is potential for collision with the above ground portion of the assembly. This can result in damage to both above ground and below ground components. Some control over such damage may be had by breakaway construction of the support column as shown in U.S. Pat. No. 3,452,766 to Fenster. However, that patent does not address concurrent damage to the connecting shaft or the difficulty in replacing the damaged parts in the field. Accordingly, it would also be of great advantage to provide breakaway structure in both the support column and connecting shaft that may be field assembled to be positioned relative to the ground surface level and to be replaceable in the field, when damaged, accurately orienting the parts with respect to the position of the valve.

Accordingly it is an object of the present invention to provide an improved post assembly for a valve having an above ground valve actuator with an easily replaceable breakaway feature for the above ground parts.

Another object of the present invention is to provide an improved post assembly for a valve having an above ground valve actuator with a superior mounting for a spring biasing the valve to an open or closed position.

A further object of the present invention is to provide an improved post assembly for a valve having an above ground valve actuator with means to assure that the parts are properly assembled in accordance with the position of the valve.

The present invention basically involves making both the post outer support column and inner connecting shaft in two demountable parts each being releasably joined at a level slightly above grade (earth surface) in a particular manner that will readily separate and protect the lower (below grade) portions from being damaged should the upper part of the column receive a lateral impact sufficient to cause the column parts to be relatively displaced. In a preferred form the invention also includes orienting means including a multi faceted valve shaft adapter and column flange stud which function to assure that the parts of the post indicating valve assembly are interconnected in proper alignment.

DESCRIPTION OF THE DRAWINGS

Further objects and advantages of the invention will become apparent upon reading the following detailed description of preferred and alternate embodiments in conjunction with the drawings wherein:

FIG. 1 is an overall side elevation of a post indicating valve assembly;

FIG. 2 is a partial side elevation in section showing a preferred embodiment of the present invention;

FIG. 3 is a section view taken at line 3—3 in FIG. 2;

FIG. 4 is a partial exploded view of certain parts shown in FIG. 2;

FIG. 5 is a side elevation of a below ground portion of the apparatus of FIG. 2 with certain parts broken away for clarity;

FIG. 6 is a detail side elevation view of an internal part of the apparatus shown in FIG. 2;

FIG. 7 is a plan view of one end of the part in FIG. 6;

FIG. 8 is an opposite end view of the part in FIG. 6;

FIG. 8A is a similar view of an alternate embodiment of the part in FIG. 6;

FIG. 9 is a detail plan view of the valve shaft adaptor of the apparatus shown in FIG. 2;

FIG. 10 is a detail side view of the adaptor of FIG. 9;

FIG. 11 is a partial side elevation in section showing an alternate embodiment of the present invention;

FIG. 12 is a section view taken at line 12—12 in FIG. 11.

FIG. 13 is a partial side elevation in section showing another alternate embodiment of the present invention;

FIG. 14 is a section view taken at line 14—14 in FIG. 13;

FIG. 15 is a partial side elevation in section showing still another alternate embodiment of the present invention;

FIG. 16 is a section view taken at line 16—16 in FIG. 15;

FIG. 17 is a partial side elevation in section showing a further alternate embodiment of the present invention; and FIG. 18 is a section view taken at line 18—18 in FIG. 17.

DETAILED DESCRIPTION OF THE INVENTION

An over all valve post and indicator assembly is illustrated in FIG. 1 wherein a buried valve generally 20, having a pivotable disk 22 secured to a shaft 24 within a housing 26 in turn connected by flanges 28 to pipes (not shown) beneath grade level, is also connected by a cylindrical column generally 30 to an above ground indicator generally 32 and mechanical actuator generally 34 which is manually operated by a crank 36. Accordingly to the present invention the column is comprised of upper section 44 and a lower section or bonnet 50 joined at respective outward peripheral flanges 46, 52 with fasteners generally 54.

The upper column section 44 is of a standard length, e.g. about 30 inches, and the lower section 50 may be supplied from a range of lengths, appropriate to construction needs, chosen to locate the flanges 52, 46 about nine inches above grade level where repair and/or replacement may be facilitated.

In the present invention it is significant that the fasteners generally 54 incorporate a first breakaway means which will give way should the upper column section 44 receive a damaging impact. In this way it may be possible, in some accidents, to salvage the upper column section by minimizing deformation to it. By contrast prior breakaway provision has involved areas of weakness built into the cylindrical column, generally 30, to fracture upon impact and thus assuring that while the valve 20 would be protected the column would require replacement.

As may be best seen in FIG. 2 the lower column section (or bonnet) 50 terminates at the lower end in an outwardly extending bottom plate 58 which is fastened by bolts 60 and nuts 62 to a platform 68 atop the valve housing 26. An intermediate adapter plate 70 may be interposed between bottom plate 58 and platform 68 in some installations. Since orientation of the indicator 32 and actuator 34 to the valve disk 22 is important the respective bottom plate 58 and platform 68 are provided with bolt holes arranged nonsymmetrically to thereby force a single particular orientation between the valve housing 26 and bonnet 50; and the bottom plate 58 is relieved at one side to provide a seat 72 for a spring end or tang and for purposes that will become clear.

As shown in FIGS. 2 and 3 the peripheral flange 52 at the upper end of the bonnet 50 (lower section of the column, generally 30) preferably extends inwardly as well as outwardly of the cylindrical wall of the bonnet and contains a plurality of spaced bolt holes which correspond to the spacing of similar bolt holes in the flange 46 of upper column section 44. Since orientation of the above ground parts (namely the indicator 32 and actuator 34) to those below ground remains important there is provided orientation means between the respective flanges 52 and 46. Preferably the latter takes the form of one or more small aligned orientation ports 80 in each flange 46 and 52 and an equal number of orientation studs 82 threadedly, or otherwise, secured in the ports of one flange (conveniently flange 52 of bonnet 50) and loosely received in the other. (A similar orientation means may also be used between the bottom plate 58 and valve platform 68.) Additionally the aforementioned bolt holes and bolts in flanges 52 and 46 are preferably assymetrical and staggered about the flanges so as to assure assembly in only one orientation.

Fasteners, generally 54, secure the two flanges 46, 52 together, when the upper and lower column sections 44, 50 are assembled. However the fasteners are devised to break or deform so as to release the respective flanges should a potentially damaging lateral force be received on the upper section 44. In the preferred embodiment of FIGS. 2 and 3 the fasteners are in the form of alloy steel stripper bolts 84 having shanks 86, of a diameter sufficient to withstand the torsional forces applied to column 30, that extend through the holes in flanges 46, 52 and terminate in reduced diameter male threads 88 which fit into female threads of rectangular stripper nuts 90 under flange 52. The bolt threads 88 also may contain a plastic pellet to resist back-off. Preferably the stripper nuts 90 are manufactured from a material softer than the bolts 84 (such as low carbon steel) and the female threads are cut to a reduced depth so as to insure that the bolts 84 may be stripped from the nuts by a separating tension of about 1000 pounds but may vary as necessary by changing the material or its dimension. In this way the upper column section 44 may be forcefully separated from the bonnet 50 upon receiving a lateral impact. Moreover the rectangular shape of the nuts 90 provides an additional security factor in that the nut is prevented from turning by the lower column pipe 50 and thus is difficult to vandalize.

A connecting shaft, generally 100, extends within the column, generally 30, between the valve shaft 24 and the actuator 34 and indicator 32. This is in two parts generally corresponding to the upper and lower column sections 44, 50, joined by a disconnecting or second breakaway means. In the preferred embodiment of FIGS. 2-8 the connecting shaft comprises a standard length upper rod 102 having a reduced diameter upper neck 104 extending through a thrust bearing 106 into the actuator 34 and indicator 32 and operatively connected thereto in a manner known in the prior art. At the lower end of rod 102, which extends slightly beyond flange 52 into the bonnet 50, the rod 102 is reduced to a short axially extending key 110 which fits into a slightly larger slot 112 in a coupling disk 114 which is, in turn, fastened by welding or the like to the upper end of an extension tube 116 concentrically located within the bonnet 50. Thus rod 102 and extension tube 116 will turn as a unit. Preferably the coupling disk 114 loosely seats against the underside of an inwardly extending portion of the flange 52 on bonnet 50 so that the disk 114 and extension tube 116 may not be lifted out of the bonnet 50 once the column generally 30 has been assembled. Thus should an impact to the upper section 44 cause separation at the flanges 46, 52 the rod 102 and key 110 will simply be extracted from the slot 112.

At its lower end opposite coupling disk 114 the extension tube 116 is secured to a co-extensive socket coupling 124 which is internally shaped to receive a multi-sided valve shaft adapter nut 126. In turn the nut 126, best seen in FIGS. 9 and 10 is fastened to the valve shaft 24, as seen in FIG. 2. It is preferred that the nut 126 be shaped in a way that the socket coupling 124 may be fitted on it in only one position thereby forcing a known orientation between the extension tube 116 and the nut 126 and thereby also with the valve disk 22. This is accomplished in one embodiment by modifying a hexagonal (six sided) nut to make it heptagonal by modifying and spreading two faces (or sides) to form therebetween an additional short-odd face (seventh side). Hence the socket 124, which is correspondingly configured, will fit on the nut 126 in only one orientation, yet in an emergency a regular hexagonal socket wrench may be applied to the adapter nut 126 to turn the valve disk 22.

It will be understood that the length of the assembled coupling disk 114 extension tube 116 and socket coupling 124 is approximately equal to the length of the lower column section or bonnet 50; and is dictated by the depth of a particular valve installation.

The adapter nut 126 contains a smooth internal bore 130 with keyway 132 which slides over a key or spline (not shown) which also fits on the valve shaft 24 and the key may be fastened or welded in place through a small hole 134 extending outwardly of the nut 126 from the keyway 132.

Nuts 126 of the same outer dimensions may be stocked with several bore sizes so as to adapt a shaft and column assembly to a variety of valve shaft sizes. Additionally in a further embodiment, shown in FIG. 8A, either a nut 126, or other form of valve coupling 124, may be provided with a relatively long narrow slot 131 which will receive the flattened end 25 of a valve shaft 24 of one of several diameters.

With buried valve installations it is routine to bias the valve to either open or closed positions against the possibility that the mechanical actuator be damaged or fail. In water service to a fire prevention system the bias will likely be to an open position, while in fuel or raw material supply lines the bias will likely be to a closed position-both for reasons of safety. Such valve bias is accomplished by mechanical bias means such as a torsion spring 140 which is wound concentrically about the lower end of extension tube 116 and socket coupling 124 with an axially extending spring or tang 142 held within a retainer lug 150 on extension tube 116 and a radially extending spring tang 144 held in the spring seat 72 on the bottom plate 58 of bonnet 50.

The retainer lug 150 is preferably a "U" shaped bail secured within a hole 152 in the extension tube 116 that extends across the axial spring and 142 and holds the latter against the wall of tube 116. In this way the spring is physically prevented from bearing against the inside wall of bonnet 50 and thereby friction in the system is reduced and the chance of parts binding against one another is lessened.

As an additional orientation check it is further preferred to provide a small access port 160 in the extension bonnet 50 beneath flange 52 and a corresponding hole 162 in the edge of coupling disk 114 which holes 160 and 162 are positioned to be in alignment when the aforementioned parts are assembled with the valve disk 22 in the mechanically biased position. This also provides a means to check for tight closure of valve disk 22.

Alternate breakaway junctures of upper and lower column and connecting shaft structures are shown in FIGS. 11 through 18 where parts similar to those of the preferred embodiment of FIGS. 2-10 are denoted by like reference character bearing single, double and triple prime superscripts.

In FIGS. 11 and 12 the breakaway means for the column, generally 30', comprises a plurality of spaced relatively soft and bendable or brittle and frangible "Z" shaped brackets 170 which are secured to one column section flange, such as lower flange 52', by regular bolts 172 and engage the other column section flange, such as upper flange 46', at recesses 174. The brackets 170 and recesses 174 may be assymetrical on the respective flanges to assure one orientation of the assembly. Brackets 170 are of sufficient strength and number to withstand the normal torque forces in the system. The inner connecting shaft, generally 100', is comprised of upper and lower tubes 102', 116' which have flat sided end studs 176, 178 joined by a breakable collar 180 having a weakened groove 182. Preferably the lower end stud 178 has an annular groove to receive a thrust bearing 184 that is in turn seated on inwardly extending portion of the flange 52'.

The alternative embodiment shown in FIGS. 13-14 utilizes breakaway means for the column generally 30'' comprising a plurality of wide brackets 190 adapted to be secured to the lower column flange 52'' by pairs of bolts 192 and which have breakable or bendable end tabs 194 which engage the edge of an upper column flange 46''. In this embodiment the upper flange 46'' consists of a square plate welded to the upper column section 44'' and extending inwardly to a circular opening closely sized to the diameter of the lower extension tube 116'' of the connecting shaft generally 100''. Again the brackets 190 are sufficiently strong to withstand normal torque forces in the system. In this embodiment the lower extension tube 116'' extends through the flange 46" and has an annular lip 196 that rests on the upper inner surface of flange 46". The upper connecting shaft portion 102" is a corresponding tube having an annular lip 198 concurrent with lip 196 on extension tube 196. The two lips 196, 198 are releasably joined by a plurality of equally spaced plugs 200 which extend through holes in the lips. In this way torque force is transmitted from the upper tube 102" to the lower extension tube 116", but the two parts will readily separate in generally axial directions.

The alternate embodiment of FIGS. 15-16 is essentially a combination of the breakaway means for the outer column generally 30 in accordance with the preferred embodiment of FIGS. 2-10 and the connecting shaft generally 100" of the FIGS. 2-10 and the connecting shaft generally 100" of the embodiment of FIGS. 13-14. In this embodiment the annular lip 196 of extension tube 116" rests upon the inwardly extending portion of the lower column flange 52.

In FIGS. 17 and 18 an embodiment is partially illustrated which combines the breakaway connecting shaft 100' of FIGS. 11-12 with an upper column generally 30''' wherein the upper section 30''' may be flangeless. In this embodiment the lower portion of the upper column section 30''' contains a plurality of spaced radial slots 204 which receive an equal number of bendable or breakable brackets 206 that are secured to the flange 52' of lower column section 50' by bolts 208. In the embodiment illustrated there are four wide brackets held by two bolts each however it would be possible to use smaller bracket and single bolts. The brackets 206 must be sufficiently strong to withstand the normal torque forces in the system. To assure proper orientation of the column sections 30''' and 50' one of the radial slots 204 is unevenly located and the corresponding bracket 206 is assymetrically positioned on flange 52'.

The foregoing detailed description has been given for clearness of understanding and to provide a complete description of a preferred embodiment and alternate embodiments of parts of the invention. Various other modifications may be made without departing from the spirit and scope of the invention which is defined in the claims.

What is claimed is:

1. An improved post assembly for a buried valve wherein the valve is rotatable by a valve shaft within a valve housing between open and closed positions, said post assembly comprising:
   a support column to extend from said valve housing to an above grade indicator and valve actuator, said support column having a lower column section connectable to said valve housing and extending to a peripheral flange at a first level at about grade surface and an upper column section abutting said flange and extending toward said indicator and valve actuator;
   first breakaway means normally holding said upper column section on said flange, said first breakaway means being disengageable from at least one of said upper column sections and flange upon a sufficient impact force being applied laterally of said upper column sections;
   a connecting shaft extending axially through said support column said connecting shaft having upper and lower shaft portions substantially coextensive with said upper and lower column sections with said upper shaft portion extending into said valve actuator and the lower shaft portion terminating in a socket member engageable with an odd shaped nut secured to said valve shaft;
   second breakaway means normally holding said lower and upper connecting shaft portions together at about said first level whereby to transmit torque from said actuator to said valve shaft yet permitting separation of said upper and lower shaft portions upon said upper. and lower column sections becoming separated;
   a torsion spring concentrically positioned around the bottom of said lower shaft portion and socket member with one end of said spring held between said lower column sections and said valve housing and the other end of said torsion spring being held in place against the lower shaft portion whereby to bias the lower shaft portion to turn said valve to one of said open and closed positions
   and alignable holes on said lower shaft portion and through said lower column section adjacent said peripheral flange, said holes socket member and odd shaped nut being arranged so that said holes are in alignment only when said valve is in said one position.

2. The post assembly of claim 1 wherein the first breakaway means is a plurality of bolt strip nuts.

3. The post assembly of claim 1 wherein the first breakaway means is a plurality of brackets that will bend or break.

4. The post assembly of claim 1 wherein the said second breakaway means is an axially extending key on one of said lower and upper connecting shaft portions which key is received in a slot on the other of said connecting shaft portions.

5. The post assembly of claim 1 wherein the said second breakaway means is a breakable collar.

6. The post assembly of claim 1 wherein the said second breakaway means comprises annular lips on each of said lower and upper connecting shaft portions said lips abutting one another and having plural aligned holes which releasably receive connecting plugs.

7. The post assembly of claim 6 wherein the annular lip on said lower connecting shaft portion is sliding supported at about said first level upon a flange extending radially inwardly from one of said lower and upper column sections at said first level.

8. The post assembly of claim 1 wherein said odd shaped nut is multi-sided with at least one side being of a dimension different from all other sides.

9. The post assembly of claim 1 wherein said odd shaped nut is multi-sided with at least two angles between sides being greater than the other angles between sides.

10. The post assembly of claim 9 wherein said odd shaped nut is heptagonal.

* * * * *